United States Patent Office 2,766,429
Patented Oct. 9, 1956

2,766,429

CAPACITIVE ACCELEROMETER

Hans E. Hollmann, Oxnard, Calif., assignor to the United States of America as represented by the Secretary of the Navy Application July 23, 1952, Serial No. 300,565

4 Claims. (Cl. 324—70)

(Granted under Title 35, U. S. Code (1952), sec. 266)

The invention described herein may be manufactured and used by or for the Government of the United States of America for governmental purposes without the payment of any royalties thereon or therefor.

This invention relates to an accelerometer of the type wherein acceleration is determined as a function of the difference of two successive velocities as indicated by capacitive speedometers.

This application is a continuation-in-part of my copending application Serial No. 293,496, filed 13 June 1952, entitled "Speedometer," now Patent No. 2,743,417, in which a linear scale, capacitive discharge speedometer having an internal calibration attenuator is described.

A simple known method for obtaining a direct indication of acceleration is the cross-needle method in which the instrument needles of two speedometers play across a family of curves on a single instrument dial. Their point of intersection relative to the various curves gives the acceleration. The speedometers may conveniently be of the type in which the time interval required for an object to pass two fixed points is measured by the extent to which a capacitor has discharged during that time interval. In the instant invention, one instrument indicates the discharge voltage of the capacitor in the normal manner to designate velocity. The other instrument, instead of indicating the discharge voltage of its capacitor, indicates the difference between the two capacitor voltages. The combination of the pointer readings relative to the instrument scales give the acceleration. Consequently, the accuracy of the reading does not depend on a small difference between two relatively large values as in the case of the cross-needle method heretofore employed.

An object of the invention is to provide an improved apparatus wherein time intervals as measured by discharging capacitors may be utilized for the accurate determination of the velocity and acceleration of a moving object.

Other objects and many of the attendant advantages of this invention will be readily appreciated as the same becomes better understood by reference to the following description.

Figure 1:
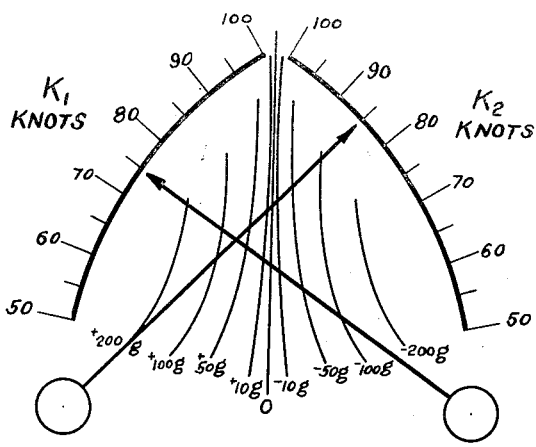
Fig. 1 is a diagrammatic view illustrating the calibration characteristics of a cross-needle accelerometer of known type.

The well known type of apparatus shown in Fig. 1 comprises two speedometers arranged in such fashion that the scales form a Gothic arch. The point of intersection of the instrument needles plays across the family of curves drawn inside the arch having acceleration and deceleration as parameters. Since the acceleration is proportional to the difference between two relatively large values, a small percentage error in either of the two velocity readings will cause a large error in the acceleration reading. Acceleration may, of course, be determined from velocity data by the use of graphs, tables, or nomograms, although with no increase in accuracy over the cross-needle method.

Figure 2:
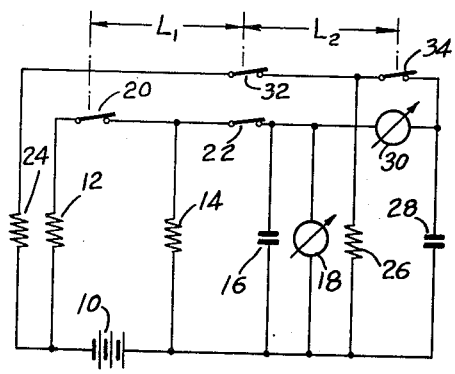
Fig. 2 is a schematic diagram of a capacitive speedometer combined with an additional discharge circuit for obtaining difference voltages.

The circuit shown in Fig. 2 includes charging battery 10, charging resistor 12, discharging resistor 14, capacitor 16, voltage indicating means 18, and switches 20 and 22. In the operation of that part of the circuit containing the above listed components, capacitor 16 is charged by means of battery 10 through resistor 12 when switches 20 and 22 are closed. The moving object under test causes switch 20 to be opened thus disconnecting battery 10 from the circuit and permitting capacitor 16 to discharge slowly through resistor 14. The moving object then causes switch 22 to open thus disconnecting all resistors from capacitor 16. The lowering of the voltage across capacitor 16 during thte interval between the opening of switch 20 and switch 21 is a function of the velocity of the object. Voltage indicating means 18 may conveniently be a low drain vacuum tube voltmeter, and switches 20 and 22 may be any of various forms known to the art such as, for example, frangible conductors positioned in the path of a projection on the moving object and sequentially broken thereby. The above mentioned copending application discloses circuit refinements which allow the use of a linear scale reading directly knots on indicator 18 and cause the indicated velocity to be independent of the absolute voltage of battery 10.

The second discharge circuit of Fig. 2 comprises second charging resistor 24, second discharging resistor 26, second capacitor 28, second voltage indicating means 30, and switches 32 and 34. The charging and discharging of capacitor 28 takes place just the same as for capacitor 16. However, indicator 30 is not connected across capacitor 28 but is instead connected to the hot terminals of the capacitors in both discharging circuits thereby giving a value directly related to the difference between speeds.

The average velocity of the object as it covers the distance $L_1$ between switches 20 and 22 is indicated by indicating means 18 in knots as $K_1$. The associated traveling time $T_1$ in seconds is $$T_1 = \frac{0.592 L_1}{K_1} \qquad (1)$$

The average velocity as the object covers the distance $L_2$ in the time $T_2$ between switch 32, which is in the same plane as switch 22, and switch 34 is $K_2$ which may be greater than, equal to, or less than $K_1$ depending on whether the object is accelerating, moving at a constant speed, or decelerating respectively. $L_2$ is selected to be equal to $L_1$ to simplify computations. The acceleration ($a$) follows as $$a = \frac{K_2 - K_1}{T_a} \qquad (2)$$

where $T_a$ is the average time in seconds; and $$T_a = \tfrac{1}{2}(T_1 + T_2) = \frac{0.592}{2} \cdot L\left(\frac{1}{K_1} + \frac{1}{K_2}\right) \text{ in seconds} \qquad (3)$$

The acceleration is then:

$$a = 3.378 \frac{K_1 K_2}{L_1} \cdot \frac{K_2 - K_1}{K_2 + K_1} \text{ in knots·sec.}^{-1} \qquad (4)$$

or, in other units:

$$a = 5.7 \frac{K_1 K_2}{L_1} \cdot \frac{K_2 - K_1}{K_2 + K_1} \text{ in feet·sec.}^{-2} \qquad (5)$$

Since indicator 30 is not adapted to read the velocity $K_2$, the acceleration formulas must be in terms of voltages. The difference between voltages on capacitors 28 and 16 is expressed as $V_2-V_1=\Delta V$. The acceleration is related to voltages $V_1$ and $\Delta V$ by the equation $$K_2-K_1=\frac{0.592L}{\theta}\left(\frac{1}{\log_e\frac{V_1}{V_0}}-\frac{1}{\log_e\frac{V_2}{V_1}}\right)= 1.698\frac{\theta}{L_1}K_1K_2\log_e\frac{V_2}{V_1} \quad (6)$$

where $V_0$ is the voltage present on capacitors 16 and 28 before any switches are opened. $\theta$ is the time constant of the two similar R·C combinations of resistor 14 with capacitor 16, and resistor 26 with capacitor 28. The above expressions show that it is not the absolute voltage sensitivity of the two discharging circuits which is important in measuring acceleration, but only the relative sensitivity of the difference voltmeter 30.

Combining Equations 5 and 6 gives an acceleration formula in which the acceleration A is in gravity units as $g$'s:

$$A=0.3\frac{\theta}{L_1^2}\cdot\frac{(K_1K_2)^2}{K_1+K_2}\log_e\frac{V_2}{V_1} \quad (7)$$

or by introducing $\Delta V=V_2-V_1$:

$$A=0.3\frac{\theta}{L_1^2}\cdot\frac{(K_1K_2)^2}{K_1+K_2}\log_e\left(1+\frac{\Delta V}{V_0}e^{\frac{0.592}{K_1\cdot\theta}}\right) \quad (8)$$

Obviously, the acceleration depends only on the independent variables $K_1$ and $$\frac{\Delta V}{V_0}$$

because $K_2$ is related to $\Delta V$. As long as $$\frac{\Delta V}{V_0}\ll 1$$

the logarithm of Equation 8 reduces to:

$$A=0.3\frac{\theta}{L_1^2}\frac{(K_1K_2)^2}{K_1+K_2}e^{\frac{0.592}{K_1\theta}}\frac{\Delta V}{V_0} \quad (9)$$

and at very low accelerations $K_1\cong K_2$, and $$A\approx 0.15\frac{\theta}{L^2}K_1^3 e^{\frac{0.592}{K_1\theta}}\frac{\Delta V}{V_0} \quad (10)$$

In contrast to the simple cross-needle method, the acceleration sensitivity now is proportional to the relative sensitivity $$\frac{V_0}{\Delta V}$$

of the difference voltmeter and can be made very high.

Figure 3:
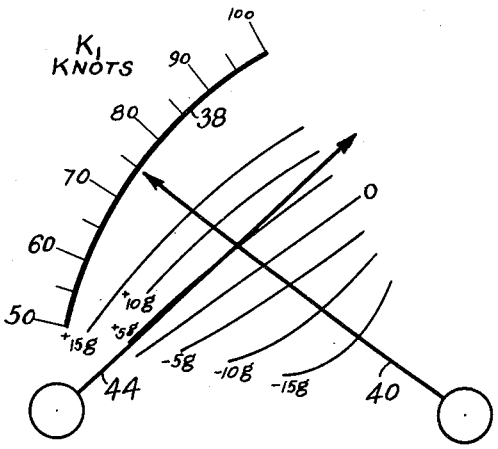
Fig. 3 is a view illustrating the calibration characteristics of an accelerometer embodying the invention.

The calibration characteristics of the circuit described in connection with Fig. 2 are shown in Fig. 3. Both voltmeter needles play across the curved scales in the same manner as in Fig. 1. It will be noted that the acceleration curves are in expanded form so that acceleration sensitivity and accuracy are greatly improved. The speed of the object is indicated on scale 38 by means of meter needle 40. The intersection of the two instrument needles plays over a series of curves for various values of acceleration expressed as gravity units commonly known as $g$'s. Within all ranges of acceleration commonly encountered in guided missile work, for example, Equation 10 may be utilized for computing the curves. For very high acceleration rates, Equation 8 gives accurate results.

Figure 4:
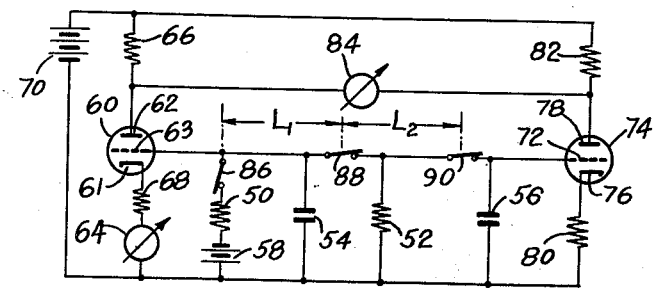
Fig. 4 is a schematic diagram of a modified form of the invention.

Fig. 4 shows a three switch accelerometer which is an improvement over the four switch type discussed in connection with Fig. 2 that calls for two separate and exactly equal discharging circuits adapted to be triggered by two equivalent pairs of contacts. In order to obtain a high degree of accuracy with the four switch arrangement, a highly sensitive voltmeter is required. The four switch instrument can be simplified by combining the two discharging circuits into one integral unit which not only is triggered by three successive contacts but the adjustment is much simpler than that of the two separate circuits. A common charging resistor 50, a common discharging resistor 52, and two capacitors 54 and 56 are connected in parallel. Voltage source 58 is in series with resistor 50. The charge on capacitor 54 is applied to a voltage indicating means shown in simplified form as a voltmeter including an electronic tube 60 having cathode 61, plate 62, and grid 63. Indicating means 64 is connected effective to measure plate current flow and may be calibrated to indicate speed in knots. Plate resistor 66 and cathode resistor 68 limit the flow of current from plate battery 70. The voltage on capacitor 56 is applied to grid 72 of tube 74 acting as a voltage amplifier stage and which also contains cathode 76 and plate 78. Cathode resistor 80 and plate resistor 82 limit plate current flow through tube 74. Voltage indicating means 84 is connected between plate 62 and plate 78. The cathode heaters are not shown but will be understood to be any of numerous common types. Switches 86, 88, and 90 are positioned as shown to define two equal distances $L_1$ and $L_2$. In the speedometer circuit the total time constant $\theta_1$ is given by the equation $$\theta_1=R_{52}(C_{54}+C_{56}) \quad (11)$$

in which $R_{52}$ is the resistance of resistor 52 and the quantity $C_{54}$ and $C_{56}$ is the combined capacitance of capacitors 54 and 56. The speedometer circuit is triggered by the opening of switch 86. When switch 88 is opened, capacitor 54 keeps its discharged voltage $V_1$ as $$V_1=V_0 e^{\frac{-0.592L_1}{K_1\theta_1}} \quad (12)$$

so that meter 64 indicates the basic speed $K_1$. Capacitor 56, however, continues to discharge during the time $T_2$ until switch 90 opens under the lower time constant $$\theta_2=R_{52}C_{56} \quad (13)$$

so the final voltage is $$V_2=V_1 e^{-\frac{0.592L_2}{K_2\theta_2}} \quad (14)$$

In order to make the discharging circuits as symmetrical as possible, it is convenient to select:

$$\frac{L_1}{\theta_1}=\frac{L_2}{\theta_2}=\frac{L}{\theta} \quad (15)$$

so that $V_2$ can be written:

$$V_2=V_0 e^{-0.592\frac{L}{\theta}\left(\frac{1}{K_1}+\frac{1}{K_2}\right)} \quad (16)$$

Because the capacitor voltages $V_1$ and $V_2$ cannot be balanced, the difference indicating instrument 84 must be inserted between the outputs of the two vacuum tubes 60 and 74. The lower voltage amplification required of tube 60 is achieved by means of the relationship of plate resistors as $R_{82}>R_{66}$ and cathode resistors as $R_{80}>R_{68}$. It will readily be seen that the difference instrument 84 shows no deflection at zero acceleration if both tubes are carefully balanced by means of proper selection of resistors. The acceleration curve is not a straight line as is the speedometer curve. This nonlinearity is compensated for by the simplified circuit required and the ease of obtaining any desired sensitivity.

Several accelerometers may be arranged along a launching ramp, for example, and the velocity-distance and acceleration-distance diagrams can be plotted immediately after each test. The described instruments are also useful for checking and calibrating other types of accelerometers on the basis of a linear movement and acceleration.

Obviously many modifications and variations of the present invention are possible in the light of the above teachings. It is therefore to be understood that within the scope of the appended claims the invention may be practiced otherwise than as specifically described.

What is claimed is:

1. An accelerometer comprising a D. C. voltage source, a first capacitor, a discharging resistor, a second capacitor, means connecting said capacitors and said discharging resistor in parallel with said voltage source, first switch means for disconnecting said voltage source from said capacitors and said discharging resistor, second switch means connected effective when actuated to disconnect said discharging resistor and said second capacitor from said first capacitor, third switch means connected effective when actuated to disconnect said discharging resistor from said second capacitor, a first voltage amplifier connected effective to amplify the voltage on said first capacitor, a second voltage amplifier connected effective to amplify the voltage on said second capacitor, a first indicating means connected effective to indicate the difference in output voltages of said first and second voltage amplifiers and a second indicating means connected effective to indicate the output voltage of said first voltage amplifier.

2. An accelerometer comprising a first discharge circuit including a D. C. voltage source, a first capacitor connected across said voltage source, a first discharging resistor connected across said first capacitor, a first voltage indicating means connected across said first capacitor, first switch means connected in series with said voltage source and said first discharging resistor, second switch means connected in series with first discharging resistor and said first capacitor, a second discharge circuit including a second capacitor connected across said voltage source, a second discharging resistor connected across said capacitor, third switch means connected in series with said voltage source and said second discharging resistor, fourth switch means connected in series with said second discharging resistor and said second capacitor, means connecting one terminal of said first capacitor to one terminal of said second capacitor and one terminal of said first voltage indicating means, and a second voltage indicating means connected across the other terminals of said first and second capacitors.

3. An accelerometer comprising a pair of substantially identical electrical energy storage circuits including capacitor means, means for charging said circuits, switch means connected in series with said charging means and said capacitor means to initiate and terminate discharge of said circuits, a first voltage indicating means connected between said capacitors to measure the difference in charge thereon and a second voltage indicating means connected to one of said capacitors to measure the charge thereon.

4. A device as defined in claim 3 wherein said first voltage indicating means has a first indicating needle connected thereto and said second voltage indicating means has a second indicating needle connected thereto, said second indicating needle being displaced relative to said first indicating needle to produce a cross needle display, and a plurality of graduated scales disposed adjacent said needles whereby said first needle indicates velocity and the point of crossing of said needles indicates acceleration.

References Cited in the file of this patent

UNITED STATES PATENTS

| | | |
|---|---|---|
| 1,526,337 | Hartley | Feb. 17, 1925 |
| 1,925,483 | Dubois | Sept. 5, 1933 |
| 2,102,166 | Van Roberts | Dec. 14, 1937 |
| 2,423,194 | Long | July 1, 1947 |
| 2,620,380 | Baldwin | Dec. 2, 1952 |
| 2,641,458 | Gilvarry | June 9, 1953 |